United States Patent
Takamizawa et al.

(10) Patent No.: US 6,886,050 B2
(45) Date of Patent: Apr. 26, 2005

(54) METHOD FOR CONTROLLING A COMMUNICATION TERMINAL DEVICE AND REWRITABLE STORAGE MEDIUM HAVING INITIALIZATION SETTING DATA

(75) Inventors: Yuji Takamizawa, Suwa (JP); Atsushi Yamaji, Suwa (JP); Kazuko Fukano, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 260 days.

(21) Appl. No.: 09/796,065

(22) Filed: Feb. 27, 2001

(65) Prior Publication Data

US 2001/0021954 A1 Sep. 13, 2001

Related U.S. Application Data

(63) Continuation-in-part of application No. 09/698,778, filed on Oct. 27, 2000.

(30) Foreign Application Priority Data

Oct. 29, 1999 (JP) ............................................ 11-309954
Mar. 30, 2000 (JP) ....................................... 2000-095705

(51) Int. Cl.⁷ ................................................. G06F 3/00
(52) U.S. Cl. ............................... 710/8; 710/5; 710/10; 710/16; 710/18; 710/19; 710/62; 710/100
(58) Field of Search ........................... 710/5, 8, 10, 16, 710/18, 19, 62, 100, 4, 104; 712/405; 711/170; 713/1, 2, 100

(56) References Cited

U.S. PATENT DOCUMENTS

| | | | |
|---|---|---|---|
| 4,710,886 A | | 12/1987 | Heath |
| 5,014,193 A | * | 5/1991 | Garner et al. ................. 710/10 |
| 5,050,098 A | | 9/1991 | Brown, III et al. |
| 5,432,698 A | * | 7/1995 | Fujita .......................... 600/301 |
| 5,566,278 A | * | 10/1996 | Patel et al. ................. 358/1.15 |
| 5,594,653 A | | 1/1997 | Akiyama et al. |
| 5,611,046 A | * | 3/1997 | Russell et al. ............. 358/1.16 |
| 5,713,006 A | * | 1/1998 | Shigeeda ..................... 711/170 |
| 5,800,081 A | | 9/1998 | Teradaira et al. |
| 5,930,358 A | * | 7/1999 | Rao ............................ 713/193 |
| 5,954,807 A | * | 9/1999 | Kikinis ........................ 710/68 |
| 6,029,198 A | * | 2/2000 | Iizuka ........................ 709/223 |
| 6,082,910 A | | 7/2000 | Teradaira et al. |
| 6,147,767 A | * | 11/2000 | Petteruti et al. ........... 358/1.18 |
| 2002/0048039 A1 | * | 4/2002 | Nishikawa ................. 358/1.15 |

FOREIGN PATENT DOCUMENTS

| | | | | |
|---|---|---|---|---|
| EP | 0 685 819 A2 | | 12/1995 | |
| JP | 01026866 A | * | 1/1989 | .......... G03G/15/00 |
| JP | 01082978 A | * | 3/1989 | ............ B41J/29/38 |
| JP | 03252267 A | * | 11/1991 | ............ H04N/1/32 |
| JP | 04217018 A | * | 8/1992 | ............. G06F/3/12 |
| JP | 08-069362 | | 3/1996 | |
| JP | 09-222962 | | 8/1997 | |
| JP | 11-073284 | | 3/1999 | |
| JP | 2000010741 A | * | 1/2000 | ............. G06F/3/12 |
| JP | 2000-076030 | | 3/2000 | |
| JP | 2000155733 A | * | 6/2000 | ........... G06F/13/00 |
| JP | 2000-200160 | | 7/2000 | |

* cited by examiner

*Primary Examiner*—Jeffrey Gaffin
*Assistant Examiner*—Angel L. Casiano
(74) *Attorney, Agent, or Firm*—Rosalio Haro

(57) ABSTRACT

A communication terminal device autonomously activates a specific function predetermined by a host device even when the communication terminal device is off-line when the power turns on. The specific function is a function such as an offline response function or auto-status back (ASB) function for automatically reporting a status of the communication terminal device to the host device. A status monitoring command is provided. During normal operation, the host device sends this status monitoring command to the communication terminal device to store specific data in nonvolatile memory in the communication terminal device. When power turns on, the communication terminal device reads the content of this nonvolatile memory to automatically initialize the particular functions indicated by the stored content, such as an ASB or off-line response function.

20 Claims, 7 Drawing Sheets

STATUS MONITOR

DRIVER NAME XXXXX

PRINTER INFORMATION
- ☐ NO RESPONSE
- ☐ NONRECOVERABLE ERROR
- ☐ AUTOMATICALLY RECOVERABLE ERROR
- ☑ OFF-LINE
- ☐ RESTORED ON-LINE
- ☐ PAPER FEED (BY PAPER FEED BUTTON)
- ☐ PRESENTER COVER OPEN
- ☐ MECHANICAL ERROR
- ☐ AUTO-COUNTER ERROR
- ☐ PLATEN OPEN
- ☐ PRINTING OVER

[SAVE]
[AUTO-STATUS BACK (ASB)]
[CANCEL AUTO-STATUS BACK]
[GET STATUS INFORMATION]
[MEMORY SWITCH 8-1 ON] [MEMORY SWITCH 8-1 OFF]
[RESET PRINTER]

PAPER DETECTOR INFORMATION
- ☐ END OF ROLL, RECEIPT PAPER
- ☐ END OF ROLL, JOURNAL PAPER
- ☐ NEAR END, RECEIPT PAPER (1ST TIME)
- ☐ NEAR END, JOURNAL PAPER (1ST TIME)
- ☑ FORM RECOVERY SENSOR #3 ON
- ☐ NO FORM RECOVERY TRAY
- ☐ END OF PAPER SUPPLY OPERATION
- ☐ NEAR END, RECEIPT PAPER (2ND TIME)
- ☐ RETRACTER R1 JAM SENSOR ON
- ☐ RETRACTER R2 JAM SENSOR ON
- ☐ PRESENTER T/T SENSOR ON
- ☐ PRESENTER T/E SENSOR ON

PRINTER INFORMATION
TYPE ID
- ☑ 2-BYTE CODE   ☑ A/C   ☐ BM SENSOR

SPECIAL ID
- ☑ PRESENTER   ☐ FORM RECOVERY UNIT   ☐ FORM RECOVERY TRAY   ☐ PAPER SUPPLY   ☐ JOURNAL

AVAILABLE FONTS [        ]   ROM SIZE [ 8M BIT ]   [GET DATA]

OFF-LINE CODE INFORMATION
OFF-LINE CODE  [PRESENTER COVER IS OPEN]   [GET OFF-LINE CODE]

SHEET CONTROL  RESULTS: [SUCCESS]  [REPLACE PAPER]  [ADVANCE FORM]
[SET AUTO-RESPONSE]                                [RECOVER FORM]
[CANCEL AUTO-RESPONSE]

MAINTENANCE COUNTER INFORMATION
COUNTER NAME: [POWER ON COUNTER ▼]   COUNT: [184477]   [CONFIRM COUNT]   [RESET COUNTER]

PRINT CHECK
STATUS [        ]   [PRINT CHECK]   [TEST PRINT]   [CANCEL ERROR]

FIG. 7

METHOD FOR CONTROLLING A COMMUNICATION TERMINAL DEVICE AND REWRITABLE STORAGE MEDIUM HAVING INITIALIZATION SETTING DATA

CONTINUING APPLICATION DATA

This application is a continuation-in-part of application Ser. No. 09/698,778, filed on Oct. 27, 2000. The contents of each of which are incorporated herein by reference.

BACKGROUND OF THE INVENTION

1. Field of the Invention

The present invention relates to different types of communication terminal devices, such as printing, display, and cash-handling devices, used inside kiosk terminals, automated transaction machines (ATMs), automated cash dispensers (CD), and POS systems, and relates more particularly to a communication terminal device capable of initializing an automatic reporting function when the power is turned on, and to an initialization method for the communication terminal device.

2. Description of the Related Art

A typical ATM, cash dispenser, POS terminal, or kiosk terminal today comprises therein in addition to the main control device, such as a personal computer (referred to below as a PC or host device), various terminal process devices, such as a printer, display, cash storage device, or bar code reader, for accomplishing particular processes. The host provides central control for the overall operation of the particular ATM, POS terminal, or other device (referred to below as the "main terminal device"), and controls operation of the various terminal process devices that are part of the main terminal device. More specifically, the host controls operation of a terminal process device by sending control commands and related data to the terminal process device. Many terminal process devices disposed internally to a main terminal device are connected to the host by way of a serial port (such as RS-232C), and commands and process data are sent both ways between the host and terminal process device.

An interface device is also disposed between these devices, and a control line for communications control is provided. For example, a terminal process device can use a data terminal ready (DTR) signal to inform the host whether the terminal process device can receive data. When the DTR signal goes active, the host sets the data set ready (DSR) signal active, thus confirming that both terminals can communicate with the other before sending data. This prevents loss of data during data communication. It should be noted that terminal process devices such as described above are herein called "communication terminal devices".

A printer such as commonly used in ATMs and POS systems enters a hold mode in which retrieving data from the receive buffer is temporarily stopped (below, this printer state is referred to as "off-line") when the cover is open or an error occurs because of a paper jam, for example. When the printer is off-line, the DTR signal goes inactive, thus informing the host that the communication terminal device (the printer in this case) is busy. In response to this busy signal, the general purpose operating system (OS) used on the host then pauses sending data to the communication terminal device until the DTR signal goes active again. When the problem causing the off-line state is resolved and the DTR signal goes active again, the host resumes sending data and thus resumes the printing process or other process interrupted when the terminal went off-line. If measures appropriate to the cause of the off-line state are not taken, various problems could occur.

For example, when a paper jam or other error occurs on the printer side, the DTR signal goes inactive, requiring an interruption in data transmission. When the operator then rectifies the error and resets the printer, the data received by the printer but not printed is lost.

Such problems as loss of data can be avoided, however, by sending a control command appropriate to the error status if the host software can detect the status of the communication terminal device. However, the following issues must be addressed if the host is to perform such a process.

(1) General purpose serial port drivers and printer drivers cannot forward commands from the host when the DTR signal is inactive.

(2) Even if data can be transmitted, the communication terminal device, e.g., printer, stops the command interpretation process when it goes off-line. Therefore, even if the control command is sent to the communication terminal device, the communication terminal device does nothing with the command while it is off-line.

To resolve problem (1) above, (a) a communication terminal device has been proposed that uses a method whereby the DTR signal is set inactive only when the receive buffer is full, and in all other off-line states keeps the DTR signal in an active state.

With a communication terminal device thus comprised control commands can be sent to the communication terminal device from the host even when the communication terminal device is off-line insofar as the receive buffer is not full.

To resolve problem (2) above, (b) a communication terminal device having a special control command (referred to below as a "real-time command") has been proposed. This communication terminal device immediately executes a real-time command as soon as it is received so that a special process can be run even when the communication terminal device is off-line.

To resolve both problems (1) and (2) above, (c) a communication terminal device having a function (referred to below as an "auto-status back" (ASB) function) for automatically notifying the host of a change in a particular communication terminal device status when said device status changes.

If the communication terminal device is off-line from the time the power is turned on because of some problem, however, it is difficult even with the communication terminal devices described as (a), (b), and (c) above for the host to run an appropriate status handling process.

By way of example, what happens with a communication terminal device combining the above-noted related-art technologies (a) and (b), that is, a communication terminal device that holds the DTR signal active except when the receive buffer is full and can execute a particular process in response to a particular real-time command, is described below.

Assume that the cover is open when the power is turned on. In this case the host can send to the communication terminal device a real-time command polling the current status of the communication terminal device. The host can thus determine that the cover of the communication terminal device is currently open.

To resume the printing or other process after the cover open condition is resolved, the host sends frequent real-time commands checking whether the cover open status has changed. Each real-time command is executed as soon as it is received by the communication terminal device, and is then stored to the receive buffer after execution.

As also noted above, the communication terminal device stops interpreting commands in the receive buffer when off-line. This means that the received real-time commands sequentially accumulate in the receive buffer. The receive buffer thus becomes filled by the accumulated real-time command, and a buffer full state occurs. When the receive buffer is full, the printer tells the host that the printer is busy. The host thus becomes unable to send real-time commands, and becomes unable to control the communication terminal device.

Problems such as described below can occur with the ASB function described as related-art technology (c) above. The ASB function is only enabled once the host sends a normal command (that is, not a real-time command as noted above) initializing (activating) the ASB function after the power is turned on. The ASB function is therefore not enabled (active) when the power is turned on, and if the ASB function is required it must first be enabled by means of a normal command. However, if the communication terminal device is off-line from when the power is turned on, the command enabling the ASB function is not interpreted, the host therefore cannot initialize the ASB function, and the ASB function therefore clearly cannot be used.

OBJECTS OF THE INVENTION

An object of the present invention is therefore to provide a communication terminal device that can automatically initialize, when device power is turned on and without a request from the host, a function for sending the status of particular terminal device parts to the host. A further object is to provide a control method relating to said initialization. Yet a further object of the invention is to provide a computer-readable program storage medium for recording a program achieving said control method.

SUMMARY OF THE INVENTION

To achieve the above object, a communication terminal device according to the present invention comprises (a) interface for data communication with a host device; (b) nonvolatile storage for storing and holding initialization settings data; (c) automatic reporting controller that can be set to an active state, and when in an active state automatically runs a specific process for sending specific data or information to the host device through the interface; and (d) initialization setting unit connected to the storage and automatic reporting controller for reading the initialization settings data from the nonvolatile storage when communication terminal device power turns on, and based on the read initialization settings data sets the automatic reporting controller to an active state.

By previously storing to a nonvolatile storage specific data or information for initializing an automatic reporting function, the reporting function can be set to an active (enabled) state in the initialization operation performed when power turns on. Specific status reports can thus be sent automatically from the communication terminal device to the host device without the host device first sending a status report request command. The host device can thus know the status of the communication terminal device even if the communication terminal device is offline.

The automatic reporting controller preferably sends said specific data or information regularly to the host device. The host device can thus obtain information from the communication terminal device regularly regardless of whether there is a change in status.

The automatic reporting controller preferably sends a status of the communication terminal device automatically to the host device. In this case the communication terminal device can send not only status reports relating to an offline state, such as an open cover or paper jam, but also reports concerning various other terminal device conditions, including the remaining ink quantity and the recovery or ether disposition of printed forms.

The automatic reporting controller preferably sends a status report to the host device when there is a change in the reported status. Because status reports (data) are sent only when there is a change in the communication terminal device status determined by the initialization settings, the burden associated with sending and receiving data can be lightened for both the host device and the communication terminal device.

A communication terminal device also comprises (e) storage controller for storing to the nonvolatile storage specific data or information for setting the automatic reporting controller to an active state as a result of a specific command sent from the host device. This makes it possible to specify the function activated by the initialization settings using an extremely simple specific command from the host device.

Yet further preferably, the storage controller stores specific data or information to the nonvolatile storage based on data received following said specific command, and can specify a reporting process of the automatic reporting controller set to an active state based on data following said specific command.

Yet further preferably, the storage controller does not perform a write process to the nonvolatile storage when the data or information to be stored based on the specific command received is identical to content already stored to the nonvolatile storage when said specific command was received. This avoids unnecessary write operations to such nonvolatile storage as flash memory devices, for example, and can thus minimize deterioration of such nonvolatile storage.

A method for initializing and setting up a reporting process function of a communication terminal device according to the present invention comprises: (a) reading specific data or information from a nonvolatile storage when communication terminal device power turns on; (b) setting a particular process function to an active state based on the specific data or information read from the nonvolatile storage; and (c) executing a specific process automatically when the specific process function is set to an active state to send specific data or information to a host device connected to the communication terminal device.

A method for initializing and setting up a reporting process function of a communication terminal device according to the present invention additionally comprises: (d) receiving a command and data sent from the host device; (e) interpreting said command received from the host device; and (f) storing specific data or information to said static nonvolatile storage based on specific data received following the command when the interpreted command is a particular command.

Yet further preferably, the data or information sent to the host device in step (c) is communication terminal device status information, and the type of status information sent is specified according to a specific command received in step (d) and specific data following said specific command.

Yet further preferably, when content stored to the nonvolatile storage and data or information to be stored based on said specific command are the same, the writing process to the nonvolatile storage in step (f) is not performed.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 is a flow chart used to describe an operation for initializing an automatic reporting function when the power is turned on;

FIG. 7 shows an exemplary status monitoring screen used by POS application 97 of the host 90 for monitoring the status of printer 10.

DESCRIPTION OF THE PREFERRED EMBODIMENTS

The preferred embodiments of the present invention are described below with reference to the accompanying figures. As noted above, the present invention can be applied to various types of communication terminal devices. It is therefore described by way of example only with reference to a printer having numerous status types and high data communication traffic with the host device such as commonly used in an ATM, POS terminal, or kiosk terminal, and is described particularly with reference to a printer for a POS system.

Embodiment 1

Figure 1:
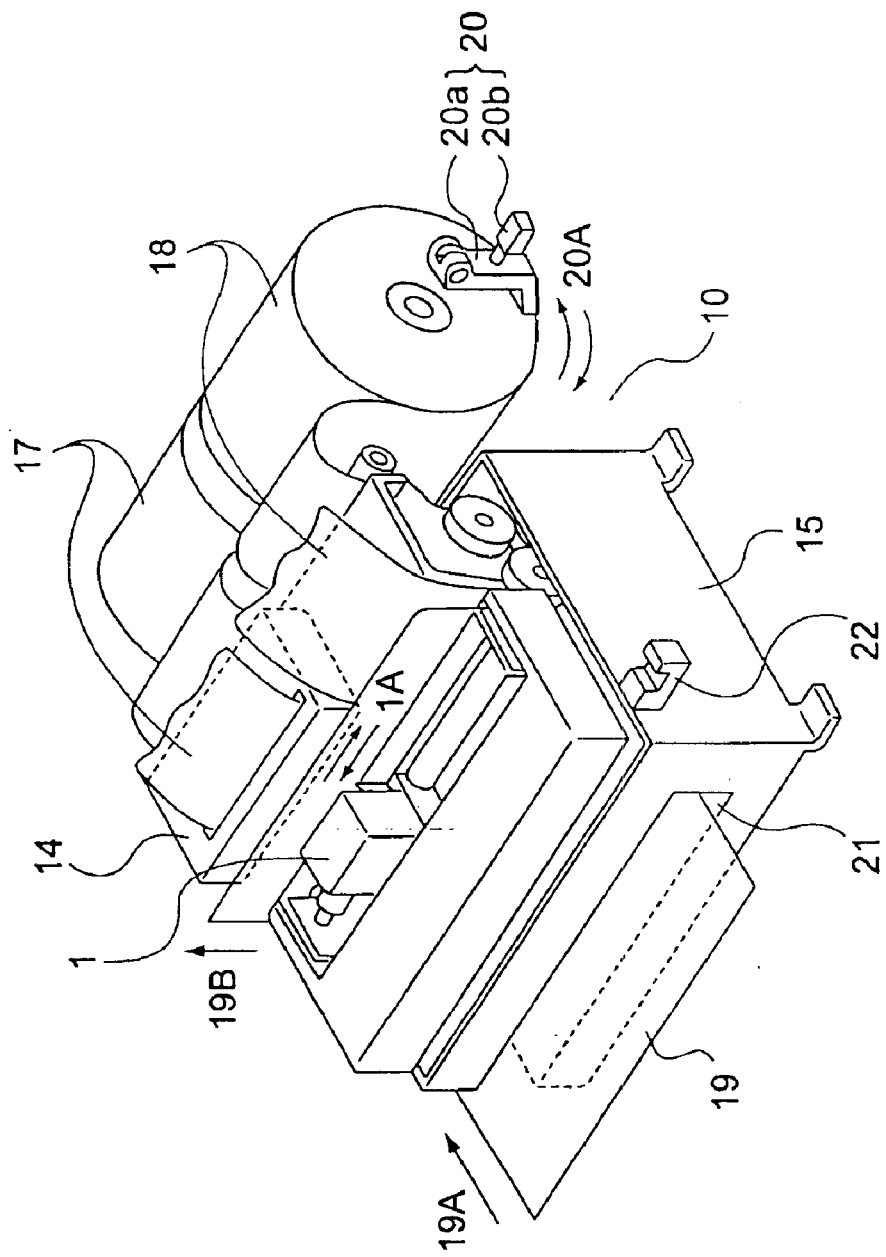
FIG. 1 shows a POS system printer as an example of a communication terminal device according to the present invention.

FIG. 1 shows a printer used in a POS system as an example of a communication terminal device according to the present invention. A printer 10 according to this example is a printer or printing to such printing media as slip form 19, journal paper 18, and receipt paper 17. Slip forms 19 are single-sheet forms of undetermined shape, such as voucher forms. When a slip form 19 is inserted in the direction of arrow 19A from slip form insertion opening 21 at the front of printer 10, a paper detector (not shown in the figure) detects the slip form, which is then guided to the print head 1 through the paper transportation path inside the case 15. The print head 1 then travels side to side in the direction of arrows 1A to print, and the slip form 19 is advanced further in the direction of arrow 19B and ejected. It should be noted that the print head 1 of printer 10 can be a wire dot head or a thermal print head.

Both journal paper 18 and receipt paper 17 are continuous forms paper, and are supplied as roll paper in this exemplary printer 10. Note that roll paper 17 and 18 is guided through case 15 to the print head 1 from the direction opposite that of slip form 19. After the information needed for a receipt is printed to receipt paper 17, receipt paper 17 is guided to paper cutter 14 whereby it is cut so that the receipt can be handed to the customer.

Particular information that the store needs to keep is printed to journal paper 18, which is then taken up by a take-up device for storage. A near-end detector 20 for detecting when there is little roll paper remaining is further disposed near roll paper 17 and roll paper 18.

The near-end detector 20 comprises a detection lever 20a that contacts the end of the paper roll as shown in FIG. 1 and swings in the direction of arrow 20A in conjunction with a change in the diameter of the roll, and a switch 20b that the detection lever 20a turns on and off. When the end of the roll approaches and the outside diameter of the roll thus becomes sufficiently small, detection lever 20a swings inward toward the middle of the roll, thus turning switch 20b on, thus detecting that the end of the roll is near.

A cover (not shown in the figure) is also provided on the case 15 of printer 10. The cover is typically open only when replacing roll paper 17, 18, and the cover is closed to the case 15 for printing. A cover detector 22 for detecting cover opening and closing is therefore disposed to case 15 so that a particular process, such as setting the printer off-line and pausing the print function, can be accomplished automatically when the cover is opened.

Figure 2:
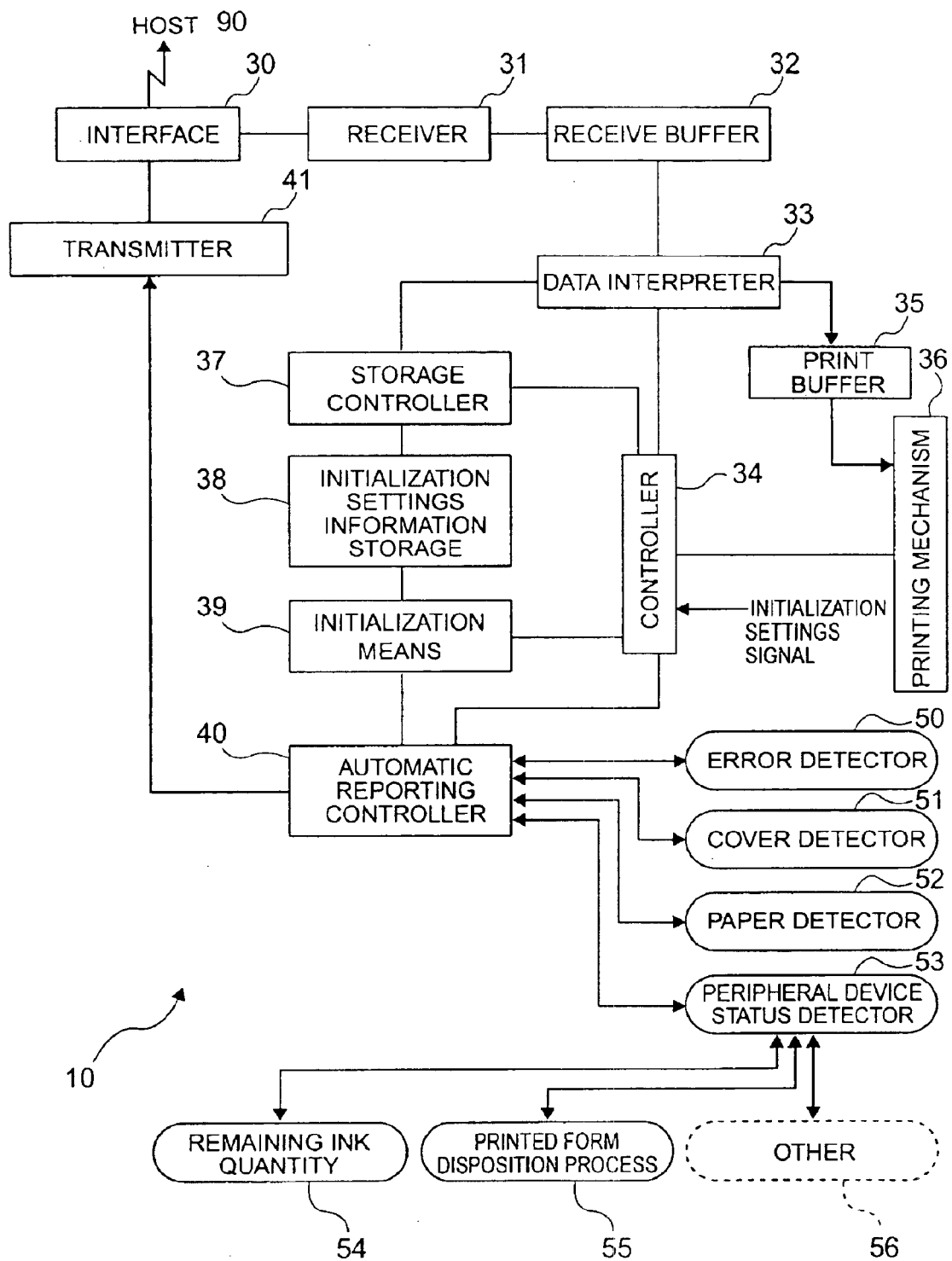
FIG. 2 is a function block diagram of a POS system used to describe the basic configuration of a preferred embodiment of the present invention.

A first preferred embodiment of the present invention is described next below with reference to FIG. 2. FIG. 2 is a function block diagram of a POS system used to describe the basic configuration of an embodiment of the invention.

Host 90 controls overall operation of the POS system, and controls operation of the various terminal devices connected to the POS system by data communication with the respective devices. For simplicity, only printer 10 is shown in this embodiment of our invention.

Printer 10 control is accomplished by control commands and data sent from host 90 to the printer 10. The host 90 can be a general purpose personal computer. The host 90 must confirm the status of printer 10 in order to control the printer 10, and the printer 10 can send a printer status report to the host 90 in response to a status request from the host 90.

The host 90 and printer 10 are connected through a serial port (RS-232C), for example. Printer control commands and other data sent from host 90 are received by a receiver 31 through the printer interface 30. Received data is stored to receive buffer 32. Data stored to receive buffer 32 is interpreted in stored order (FIFO sequence) by data interpreter 33.

The data interpreter 33 interprets commands and executes the interpreted commands. For example, if a print command is received, the print data is set up in the print buffer 35, and a controller controls the printing mechanism 36 to print the print data.

Assuming that the interpreted command is a command (such as an initialization settings command or status monitoring command) for storing initialization settings information to a storage 38 capable of storing the command. If the data interpreter 33 detects an initialization settings command, the storage controller 37 sets information specified by the initialization settings command to a specific address in storage 38. The format of the initialization settings command can be determined as desired. The data to be stored can be specified by data following the command. This data following the command can be parameters or the actual data to be stored to storage 38. The initialization settings data is thus stored to storage 38.

The storage 38 is a storage device capable of retaining data stored thereto even after power to printer 10 is turned off. Although a nonvolatile storage such as a flash memory or a disk drive is preferred, other storage devices could also be used, including memory devices that consume minimal power from an internal power supply (such as from a battery).

The initialization means 39 initializes the automatic reporting controller 40 based on the initialization settings data stored to storage 38. This initialization operation is started by an initialization control signal input from controller 34. It should be noted that while this initialization signal is always output when the power is turned on, the invention can also be comprised so that it is also output when resetting the printer.

The automatic reporting controller 40 detects various conditions (status), including errors, an open cover, the paper position, remaining ink quantity, and disposition of printed forms, by means of various detectors 50 to 56, and can send the status data by means of transmitter 41 through interface 30 to host 90. The automatic reporting controller 40 sends only the specified (activated) status information to the host 90.

Furthermore, the automatic reporting controller 40 can also send status data to the host 90 regularly at a specific time interval, or only when the power is turned on and when there is a change in status.

It should be noted that the status reporting functions, including a conventional command-enabled auto-status back (ASB) function, off-line response, printed form disposition report, extended ASB, and ink ASB, can be selectively enabled (activated) using the initialization settings command and initialization operation of the present invention.

"Status" as used herein includes all status conditions reported by any status reporting function, and all information relating to a condition of the communication terminal device other than the conditions specifically above.

An auto-status back (ASB) function is a function for automatically sending a specific status to the host 90.

An off-line response is a function for automatically reporting a specific status when the communication terminal device goes off-line.

A printed form disposition report is a function for reporting whether an already-printed form has been issued to the customer (whether the printed paper has been removed from the printer) or recovered back into the printer (the printed paper is pulled back into the printer and stored due to a time-out (the customer did not remove the paper within a specific time)).

Extended ASB is an extended, more-powerful version of the above-noted ASB function. Ink ASB is a function for automatically reporting the remaining ink quantity as at printer status.

Conventional automatic reporting functions such as these are enabled only after set by a specific corresponding command, and can then automatically report status information, but are automatically cleared when the power is turned off or interrupted.

A communication terminal device according to the present invention, however, initializes and sets automatic reporting functions whenever the power is turned on based on data stored to the static storage 38, and does not wait to receive an initialization or setup command from the host 90. The content of storage 38 can be rewritten by means of the host 90 sending the initialization settings command. Therefore, the automatic reporting function is activated by the printer initialization operation when the power is turned on even if the printer 10 is off-line due to an error, for example, and the host 90 can therefore know the printer 10 status without sending any command to the printer.

Figure 3:
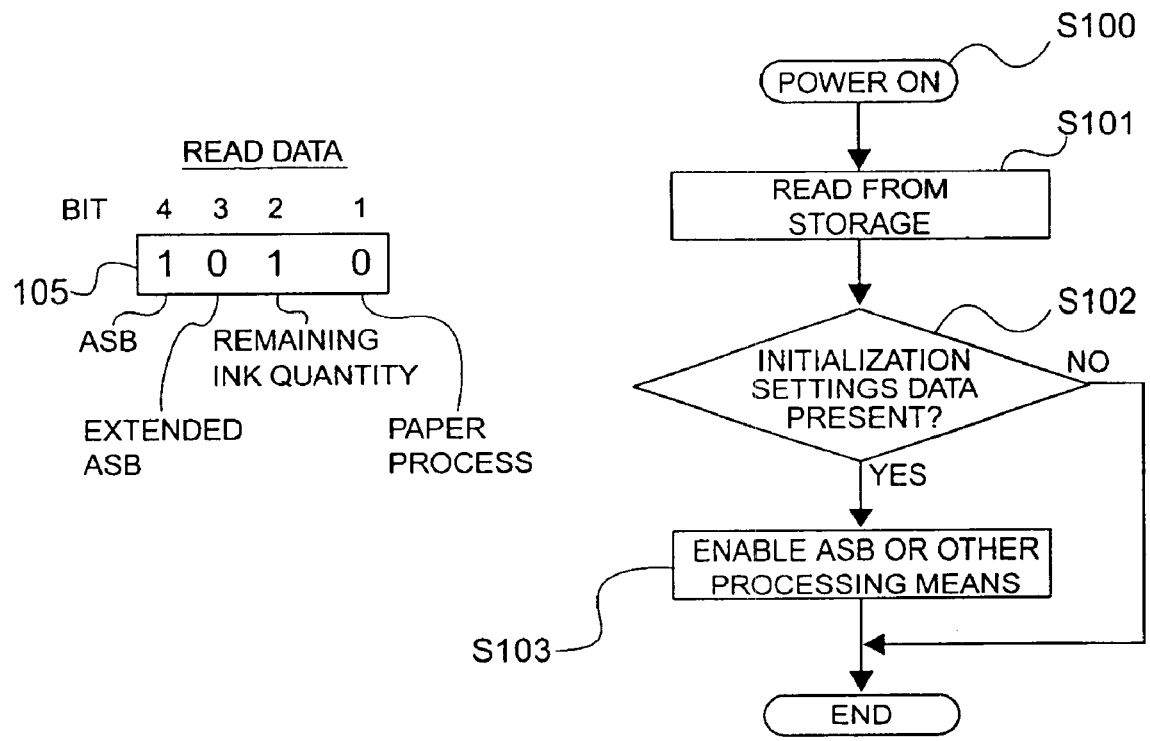

The initialization setting operation of a communication terminal device according to this preferred embodiment is described next with reference to FIG. 3. FIG. 3 is a flow chart for explaining the initialization setting operation of an automatic reporting function when the power is turned on.

An initialization signal is input to controller 34 when the power is turned on (step S100). This activates the initialization means 39 so that the initialization settings information is read from storage 38 (step S101).

An example of the initialization data 105 read in step S101 is shown to the left of the flow chart in FIG. 3. In this example the initialization data 105 comprises four bits, which are assigned as follow: bit 1 sets the paper handling status, bit 2 sets the remaining ink status, bit 3 sets the extended ASB function, and bit 4 sets the ASB function.

In this example, the initialization settings data is then stored (S102 returns yes), and the remaining ink status of automatic reporting controller 40 and the ASB reporting function are enabled (activated) because only bits 2 and 4 are on (=1) (S103). Specified automatic reporting functions are thus activated simultaneously to turning the power on.

Figure 4:
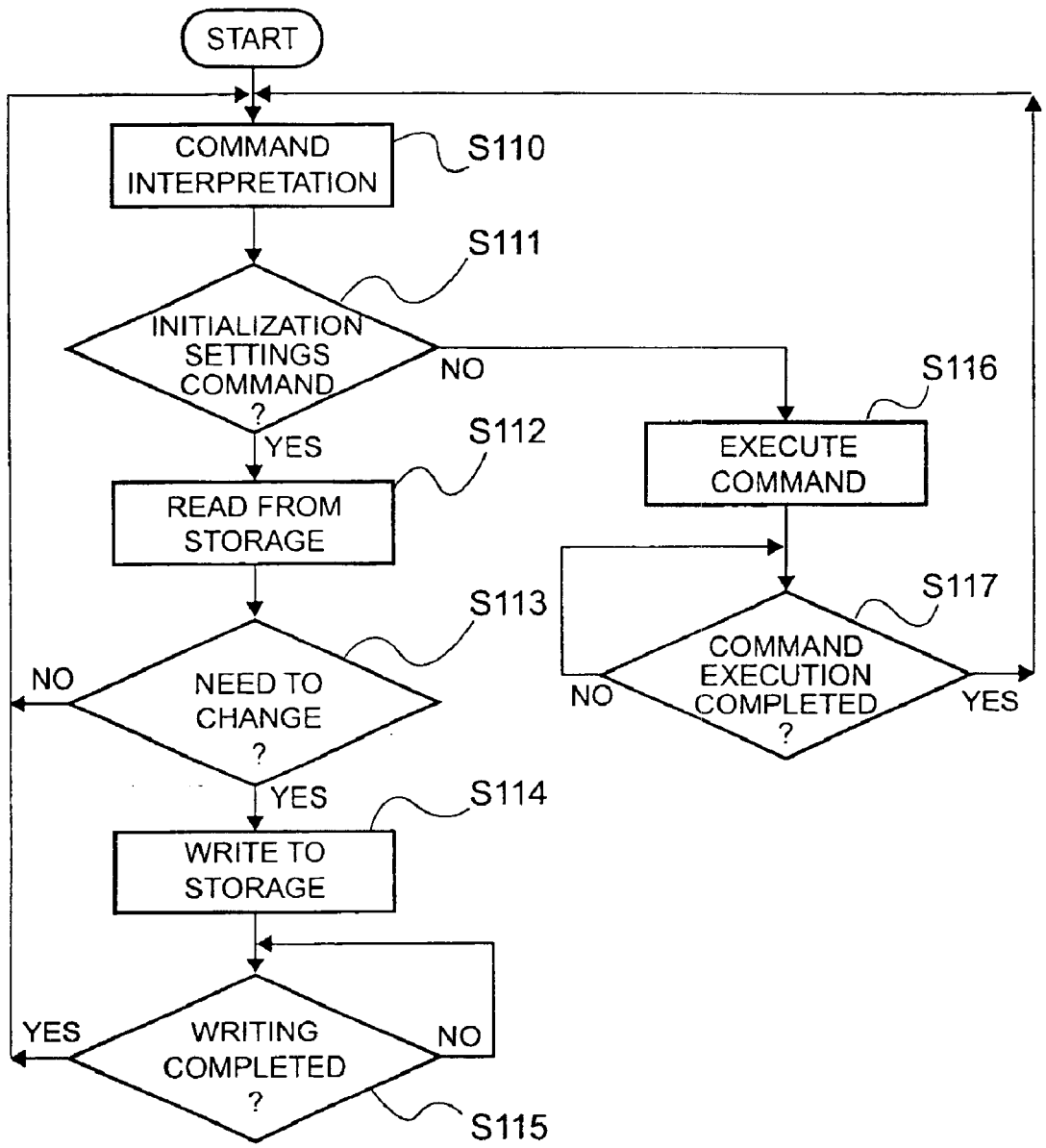
FIG. 4 is a flow chart used to describe a process for storing the initialization settings information when an initialization command is received from the host.

An operation for storing the initialization settings information to storage 38 is described next with reference to FIG. 4. FIG. 4 is a flow chart for explaining a process for storing the initialization settings information when an initialization settings command is received from the host 90.

Data received from host 90 is stored to receive buffer 32, and is then interpreted in the stored order (FIFO) by data interpreter 33 (S110).

If the stored data is not an initialization settings command (S111 returns no), the command is executed (S116). When command execution is completed (S117 returns yes), the procedure loops back to S110 to interpret the next stored data.

If the stored data is an initialization settings command (S111 returns yes), the initialization settings information is read from storage 38 (S112). If the initialization settings information already stored and the initialization settings information to be stored as a result of the initialization settings command are the same, the data is not written to memory (S113 returns no). Otherwise (S113 returns yes), the data is written to storage 38 (S114). When writing is completed (S115 returns yes), the initialization setting operation ends.

It should be noted that the initialization settings information already stored to storage 38 is compared to determine if the stored and received data are the same in order to prevent unnecessary writing operations to a flash memory device, for example, and thereby avoid deterioration of the memory device. It will also be obvious to one with ordinary skill in the related art that this comparison and confirmation step can be omitted.

Figure 5:
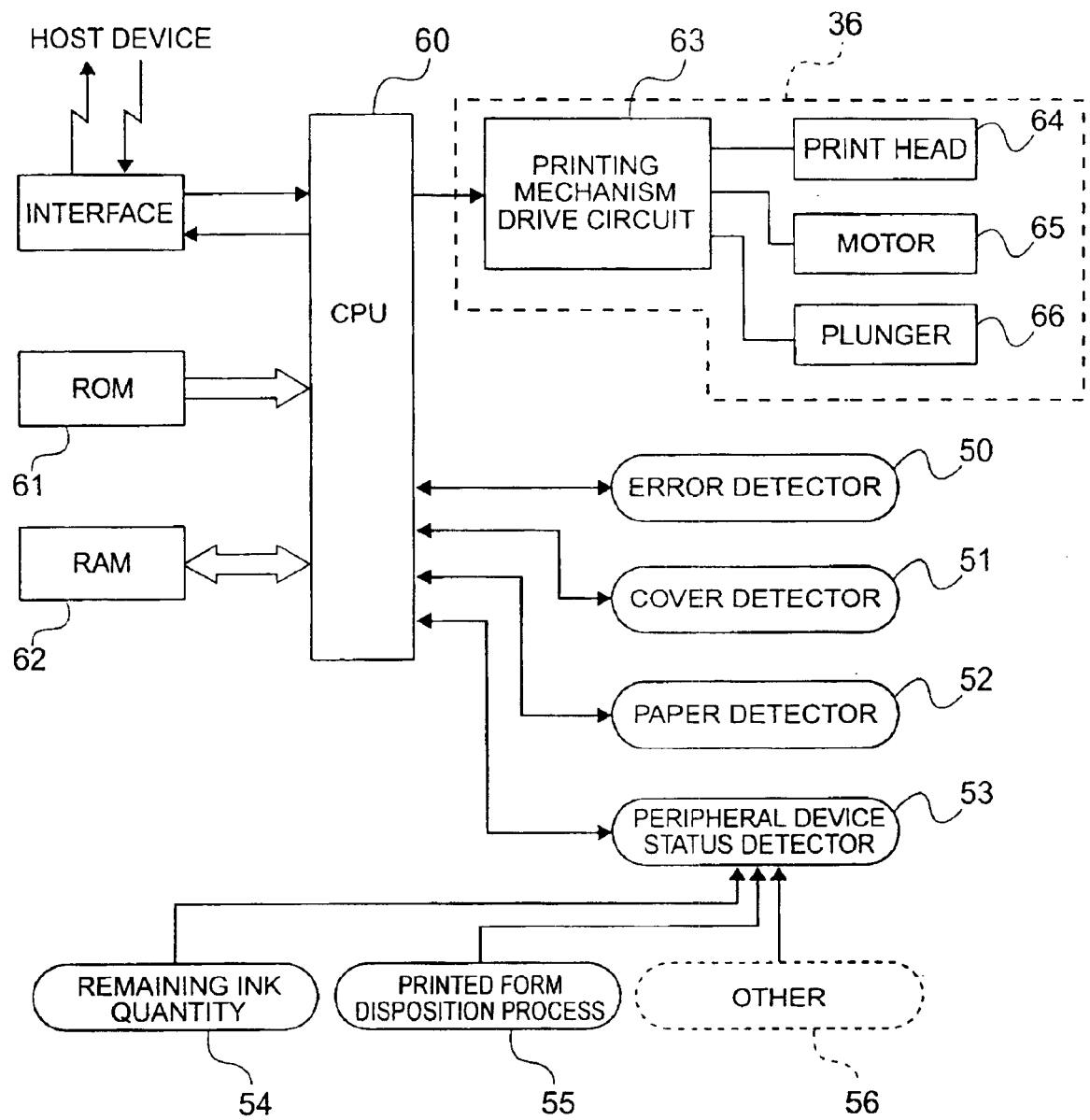
FIG. 5 is a block diagram of a typical configuration using a central control unit (CPU) 60 and ROM 61 or RAM 62 to achieve the various controller of the first embodiment of the invention.

FIG. 5 is a function block diagram showing a typical configuration whereby the controller of this first embodiment shown in FIG. 2 can be achieved using a central processing unit (CPU) 60, ROM 61, and RAM 62.

The print head 64, motors 65, plungers 66, and print mechanism drive circuit 63 for driving the aforementioned constitute printing mechanism 36 accompanied by various physical operations, including transporting the printing medium, printing, and cutting the printing medium.

An error detector 50, open cover detector 51, paper detector 52, peripheral device status detector 53, remaining ink detector 54, printed form disposition status detector 55, and other detectors 56 are connected to CPU 60. These detectors detect paper cutter errors, paper jams, and other errors, an open cover, the remaining ink quantity, and the paper position, and input the results to CPU 60.

ROM 61 stores data and a program for achieving the above-noted functions, and CPU 60 reads and executes the data and commands to achieve the functions.

Embodiment 2

Figure 6:
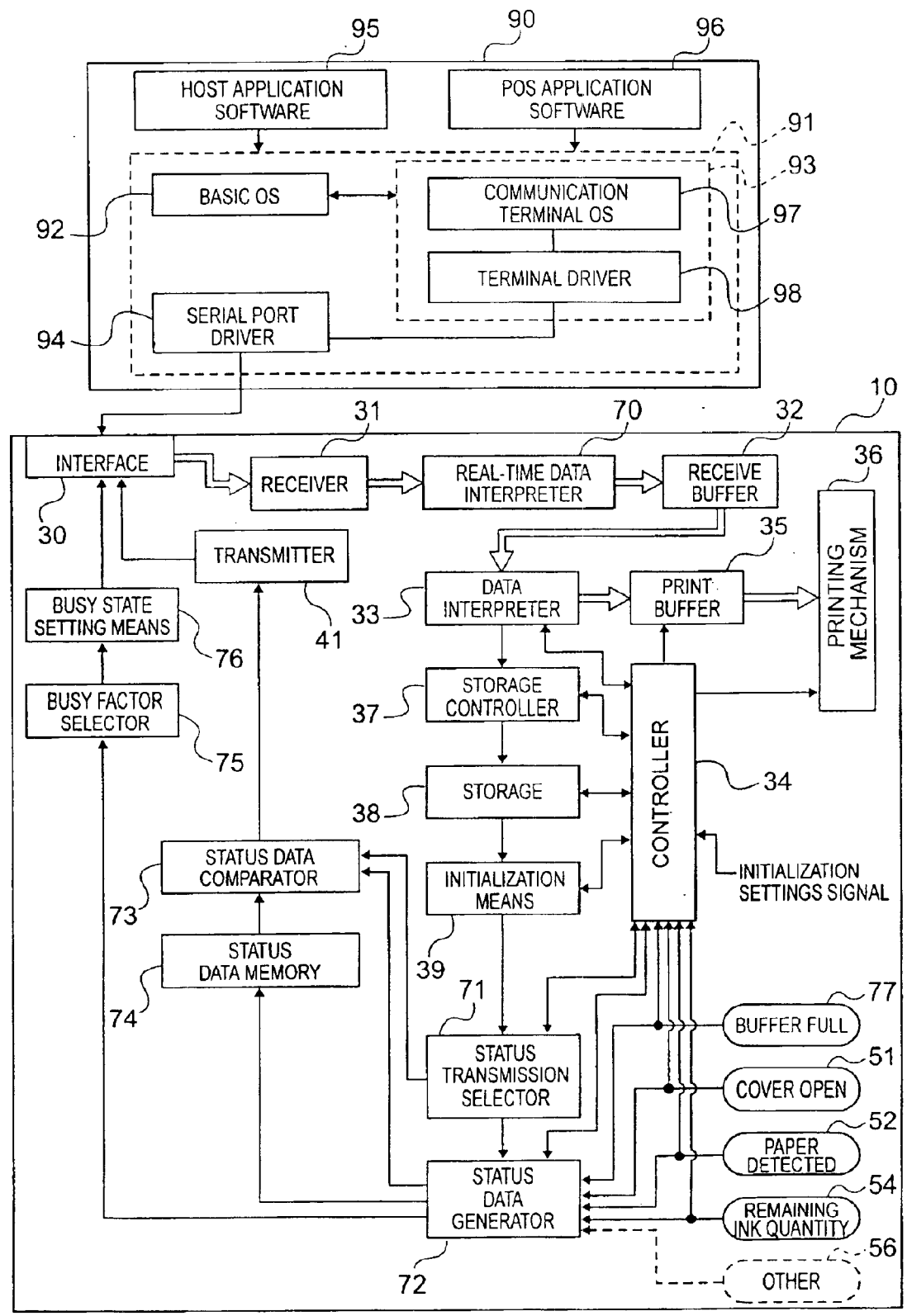
FIG. 6 shows a further exemplary configuration of a POS system comprising a personal computer (PC) 90 as the host and a printer 10 as the communication terminal device of this example.

A second preferred embodiment according to the present invention is described next with reference to FIG. 6. As shown in FIG. 6, this embodiment is an exemplary POS system comprising a personal computer (PC) as the host 90 and a printer 10 according to the above first embodiment as a communication terminal.

The printer 10 is connected to the serial port (RS-232C) of the host 90 through a serial port driver 94 in this POS system. Also connected to the host 90 of this POS system are a customer display, cash drawer, and scanner, which operate to process received data and commands only when selected by the host 90. Note that to simplify the following explanation the customer display and other components are not shown in this embodiment.

The operating system 91 of the host 90 in this embodiment comprises a basic OS 92 for controlling the keyboard, display, and other basic components of the host 90, a POS OS 93, and a serial communication port driver 94. Host application software 95 for controlling the keyboard and other components, and POS application software 96, operate under the control of this host OS 91. The POS OS 93 comprises a communication terminal OS 97 for controlling the printer 10, customer display, cash drawer, and other communication terminal device, and various drivers 98.

Spreadsheets and other application software 95 used on the host 90 operate under the control of basic OS 92, and POS application software 97 operates under the control of POS OS 93. Communicating data with the printer 10 or other communication terminal device occurs through the serial communication port driver 94 under the control of the POS OS 93, that is, the communication terminal OS 97 and the driver 98.

When printer 10 receives data through interface 30, an interrupt is issued and data receiver 31 captures the data from the interface 30. Data captured from the interface 30 is stored to the receive buffer 32 after passing through real-time data interpreter 70 during the same interrupt process. If the real-time data interpreter 70 recognizes a real-time command in the data sent from receiver 31, it performs the specific process indicated by the real-time command.

Data stored through the real-time data interpreter 70 to the receive buffer 32 is then read by data interpreter 33 in the order stored and interpreted. If a control command is detected, a process preparing for command execution is run by the controller (control circuit) 34, and any print data is stored to the print buffer 35 in a format enabling the data to be printed.

Let us assume below that the data interpreted by data interpreter 33 is a command (initialization settings command) for storing initialization settings information to storage 38 able to store the data. When the data interpreter 33 detects an initialization settings command, the data specified by the initialization settings command is written to a specific address in the initialization settings information storage 38 by storage controller 37. The format of the initialization settings command can be determined as desired for the application. The data to be stored can also be specified by data following the command. This following data can be a parameter or the actual data to be stored to initialization settings information storage 38. The data is thus stored to initialization settings information storage 38.

As in the first embodiment, initialization settings information storage 38 is a storage device that can hold content stored therein even after the printer 10 power is turned off. Although a nonvolatile storage such as a flash memory or a disk drive is preferred, other storage devices could also be used, including memory devices that consume minimal power from an internal supply (such as from a battery).

The initialization settings data stored to storage 38 is used by initialization means 39 to initialize status transmission selector 71. This initialization operation is started by an initialization control signal input by the controller 34. This initialization control signal is always output when communication terminal device power is turned on, and the communication terminal device can also be configured to output the initialization control signal whenever is reset is accomplished.

This initialization step specifies by means of a bit flags, for example, in the status transmission selector 71 the type of status information to be sent to the host 90. When one of the detectors 50 to 56, 77 detects an error or change in status as described above, it reports the detected state to the status data generator 72 and controller 34.

The status data generator 72 generates status information according to the detection states reported by the detectors 50 to 56, 77. The status transmission selector 71 controls status data generator 72 to output to status data comparator 73 the status data specified for automatic transmission (reporting).

For example, if the receive buffer 32 is nearly full or the printer is waiting for slip form insertion, this condition (status) is transmitted to the controller 34 and status data generator 72. The condition of printing mechanism 36 is also reported to the controller 34 and status data generator 72 when, for example, data processing is temporarily interrupted because the cover is open and the printer is therefore offline, an error flag is set because of a paper jam, or the near end of the roll paper is detected. The status transmission selector 71 is also set up by the initialization operation when the power is turned on or by a command received thereafter to automatically send particular status information to the host 90. For example, the status transmission selector 71 can also be set to automatically report a remaining ink quantity status to the host 90 when the remaining ink quantity drops below a specific level.

The status data produced by the status data generator 72 based on a detection signal from one of the detectors 50 to 56, 77 is output to status data comparator 73 as controlled by status transmission selector 71. The status data comparator 73 then compares the status data stored to status data memory 74 with the status data input from the status data generator 72. The status data memory 74 stores the status data previously sent to the host 90. If the previously reported status data and the current status (just received from the status data generator 72) are the same, the status data comparator 73 does not send the current status data to the host 90. By thus eliminating unnecessary transmissions, traffic and overhead accompanying data transmission with the host 90 are reduced.

Status reports can be sent at regular intervals or only when there is a change in a particular status.

The status data sent from status data comparator 73 is supplied through transmitter 41 to interface 30, and sent to the serial (RS-232C) port driver 94 on the host 90 side. The status data is then passed through POS OS 93, which comprises at least a printer driver in this embodiment, to the POS application software 96 so that the POS application 96 can select a process appropriate to the status of the printer 10 and then control the printer 10 to perform the appropriate process.

By thus providing a function for automatically reporting a printer 10 status to the host 90, a change in the status of the printing mechanism 36 or printer 10 can be automatically relayed to the application 96 so that the application 96 can determine the current condition and status of the printer 10.

Furthermore, unnecessary transmissions can be prevented if status data is sent only when there is a change in status. The processing load associated with sending and receiving status data can thus be reduced for both host 90 and printer 10, and throughput can therefore be improved.

Status data indicating if the receive buffer 32 is full (buffer full status), the cause of an error (error status) in the printing mechanism 36, and the cause of the printer going off-line (off-line factor status) are also supplied through status data generator 72 or directly (not shown in the figure) to busy factor selector 75. If a buffer full state, error, or off-line status is detected, busy state setting unit 76 outputs a busy signal to the interface 30, thereby indicating that data transmission to the host 90 should be prohibited. This prevents the loss of data sent from host 90 when the printer 10 has paused operation, and thus prevents the loss of such data because it cannot be stored to the receive buffer 32 of printer 10.

More specifically, the RS-232C standard uses the DTR signal to effect a busy signal function. The host-side RS-232C port driver 94 or printer driver 98 sends data only when the DTR signal is active, and stops sending data when the printer 10 is busy and the DTR signal is thus inactive.

A configuration is also possible in which the POS application software 97 outputs to the printer 10 a command for confirming the status, or a command requesting more detailed status information, when the near-end detector status or other monitored status changes and status data is therefore reported. Normally, data received by the printer 10 is accumulated in the receive buffer 32 in the order received, and command interpreting and processing occur in the order stored. Therefore, if a large amount of previous data is stored, it can take quite some time before starting the required command process.

Command interpreting and execution can be prevented from being delayed in such cases by using a real-time command because real-time commands are interpreted and processed by the real-time data interpreter 70 before being transferred to the receive buffer 32. Real-time commands are executed with no relationship to the order of any data or commands waiting in the receive buffer 32 for processing. The host-side application can therefore immediately obtain status information from the printer and execute a specified process, thus enabling flexible handling of error recovery and other processes.

However, when an error occurs with a general printer or the printer goes offline, the busy factor selector 75 determines that the printer is busy and operation is disabled. For this reason the busy state setting unit 76 sets the DTR signal inactive. The host OS 91 then pauses sending data to the printer 10 in response to the inactive DTR signal. The host OS 91 thus prevents a host-side POS application 96 from sending even a real-time command, for example, and host applications cannot send any commands to the printer 10.

The practical functionality of real-time commands is thus limited when a busy signal is output even if the POS application 96 has a function for using real-time commands and the printer 10 has a function for interpreting and running real-time commands.

The busy factor selector 75 in this exemplary embodiment of the present invention is therefore able to select the factors causing busy signal output so that an active busy signal is output only when a buffer full state or other major problem is possible.

FIG. 7 shows an exemplary monitoring screen used by the POS application 97 of the host 90 to monitor the condition of printer 10. Monitoring the condition of printer 10 or other communication terminal is referred to below as status monitoring. A status monitoring screen 120 such as shown in FIG. 7 enables the status of the printer 10 or other communication terminal to be known at all times on the host 90. The top line of the screen 120 identifies the screen as the status monitoring screen. The names of the various drivers used are shown therebelow.

This exemplary status monitoring screen 120 is divided into nine functional areas. Screen area 121 identifies a function for changing from this screen 120 to another screen, and applying various commands to the printer 10. The above-noted auto-status back function can be set and cancelled from this screen.

Other areas of the screen enable confirmation of particular items, including printer status information 122, paper sensor information 123, printer information 124, special ID information 125, on-line code information 126, sheet control 127, a maintenance counter 128, and a printer check 129 function.

For example, the condition of printer 10, including printer errors, can be determined from the printer status information 122. For example, the marked off-line checkbox indicates that the printer is off-line. The status of the printer paper is also shown by paper sensor information 123. Maintenance-related information and other information about the print status can also be obtained from this status monitoring screen 120.

It will be obvious to one with ordinary skill in the related art that because this status monitoring screen 120 relates specifically to the printer 10, separate screens must be provided for other types of communication terminal devices with screen content determined by the functions and features of the particular communication terminal device. Furthermore, the arrangement of the information presented on these monitoring screens can obviously be arranged and presented in various ways.

The control related functions of this second embodiment of the present invention can, in the same way as described in the first embodiment above, be achieved using CPU 60, ROM 61, and RAM 62, for example, as shown in FIG. 3.

The control methods of the first and second embodiments can be recorded to a computer-readable data storage medium such as ROM, CD-ROM, floppy disk, DVD, or semiconductor memory from which the method program is read by CPU 60 for load module generation. Alternatively, the method can be stored as a load module to the storage medium from which it can then be read directly and run or copied and then run.

Furthermore, we have described these preferred embodiments of the invention using by way of example only a printer for a POS system as the communication terminal device of the accompanying claims. It will be obvious to one with ordinary skill in the related art, however, that the invention shall not be limited to such printers. More particularly, the present invention can be applied to various types of communication terminal devices used with, for example, such transaction terminals as an ATM, cash dispenser, or kiosk terminal, and any communication terminal device of which operation is controlled by data sent from a host device is included within the scope of the accompanying claims.

A communication terminal device according to the present invention initializes when communication terminal device power is turned on a function for automatically sending to a host status information about selected parts of the terminal device. It is therefore possible to send status information automatically to the host even if the communication terminal device is off-line when the power is turned on. Furthermore, because the initialization settings can be determined by a command sent from the host, the initialization settings can be quickly and easily set or changed. Detailed process control is thus possible because a particular status can be initialized for automatic reporting for only a particular period of time and then cancelled, thus greatly improving the degree of freedom of control by the host application.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication terminal device adapted to be connected to a host device comprising:
   (a) an interface for data communication with said host device;
   (b) a rewritable nonvolatile storage for storing and holding initialization settings data;
   (c) an automatic reporting controller that can conditionally be set to an active state for automatically sending status data of the communication terminal device to said host device through said interface; and
   (d) an initialization setting unit for reading said initialization settings data stored in said nonvolatile storage in response to turning on the power to the communication terminal device, and for selectively setting said automatic reporting controller to said active state as determined from said initialization settings data.

2. The communication terminal device of claim 1, wherein said automatic reporting controller sends said status data at regular intervals to said host device.

3. The communication terminal device of claim 1, wherein said automatic reporting controller sends said status data automatically to said host device only when the communication terminal device power first turns on.

4. The communication terminal device of claim 1, wherein said automatic reporting controller detects the change in said status data and sends said status data to said host device when there is a change in status.

5. The communication terminal device of claim 1, further comprising:
   (e) a storage controller for storing a parameter value in said nonvolatile storage for setting said automatic reporting controller to either one of an active and inactive state in response to a predetermined command received from said host device.

6. The communication terminal device of claim 5, wherein said parameter value is said initialization settings data.

7. The communication terminal device of claim 5, wherein said status data is classified into a plurality of status types, and said storage controller stores a respective parameter value in said nonvolatile storage for each status type, said respective parameter value for each status type being specified by said predetermined command.

8. The communication terminal device of claim 5, wherein said storage controller prevents the storing sequence in said nonvolatile storage when said parameter value is identical to the content already stored in said nonvolatile storage.

9. The communication terminal device of claim 1, wherein the communication terminal device is a printer.

10. A control method for a communication terminal device adapted to be connected to a host device, said control method comprising:
    (a) reading initialization settings data from a rewritable nonvolatile storage in response to turning on the power to the communication terminal device;
    (b) selectively setting a particular process function to an active state as determined from said initialization settings data; and
    (c) automatically sending status data of the communication terminal device to said host device when said particular process function is in said active state.

11. The control method of claim 10, further comprising:
    (d) receiving a predetermined command sent from said host device;
    (e) interpreting said predetermined command received from said host device; and
    (f) storing a parameter value in said nonvolatile storage for setting said particular process to either one of said active state and an inactive state in response to said predetermined command.

12. The control method of claim 11, wherein said parameter value is said initialization settings data.

13. The control method of claim 11, wherein said status data is classified into a plurality of status types, and step (f) further comprises storing a respective parameter value in said nonvolatile storage for each status type, said respective parameter value for each status type being specified by said predetermined command.

14. The control method of claim 11, wherein step (f) further comprises detecting whether a parameter value already stored in said nonvolatile storage equals a corresponding parameter value that is to be saved, and saving the parameter value in said nonvolatile storage only when the values are not equal.

15. A recording medium readable by a machine and embodying a program of instructions executable by said machine for controlling a communication terminal device, said recording medium comprising:
    (a) a program code for reading initialization settings data from a rewritable nonvolatile storage in response to turning on the power to the communication terminal device;

(b) a program code for selectively setting a particular process function to an active state as determined from said initialization settings data; and (c) a program code for automatically sending status data of the communication terminal device to said host device when said particular process function is in said active state.

16. The medium of claim 15, further comprising:

(d) a program code for receiving a predetermined command sent from said host device;

(e) a program code for interpreting said predetermined command received from said host device; and (f) a program code for storing a parameter value in said nonvolatile storage for setting said particular process to either one of said active stated and an inactive state in response to said predetermined command.

17. The medium of claim 16, wherein said parameter value is said initialization settings data.

18. The medium of claim 16, wherein said status data is classified into a plurality of status types, and step (f) further comprises storing a respective parameter value in said nonvolatile storage for each status type, said respective parameter value for each status type being specified by said predetermined command.

19. The medium of claim 16, wherein step (f) further comprises detecting whether a parameter value already stored in said nonvolatile storage equals a corresponding parameter value that is to be saved, and saving the parameter value in said nonvolatile storage only when the values are not equal.

20. The medium of claim 15, wherein the recording medium comprises one of a Compact Disc, floppy disk, hard disk, magneto-optical disk, Digital Video Disc, magnetic tape, semiconductor memory, and memory devices.

* * * * *

UNITED STATES PATENT AND TRADEMARK OFFICE
CERTIFICATE OF CORRECTION

PATENT NO. : 6,886,050 B2
DATED : April 26, 2005
INVENTOR(S) : Yuji Takamizawa et al.

It is certified that error appears in the above-identified patent and that said Letters Patent is hereby corrected as shown below:

<u>Title page,</u>
Item [56], References Cited, U.S. PATENT DOCUMENTS, insert
-- 6,081,663     06/2000        Takahashi et al.
   5,537,626     07/1996        Kraslavsky et al.
   5,216,754     06/1993        Sathi et al. --;
FOREIGN PATENT DOCUMENTS, insert
-- JP    2000-076030    04/2004 --.

Signed and Sealed this

Eighteenth Day of October, 2005

JON W. DUDAS
*Director of the United States Patent and Trademark Office*